United States Patent
Ju et al.

(10) Patent No.: US 9,923,397 B2
(45) Date of Patent: Mar. 20, 2018

(54) BATTERY PACK, APPARATUS HAVING THE SAME AND METHOD OF CONTROLLING BATTERY

(71) Applicant: SAMSUNG SDI CO., LTD., Yongin-si, Gyeonggi-do (KR)

(72) Inventors: Ria Ju, Yongin-si (KR); Eui-Hwan Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 453 days.

(21) Appl. No.: 14/217,761

(22) Filed: Mar. 18, 2014

(65) Prior Publication Data
US 2015/0061572 A1   Mar. 5, 2015

(30) Foreign Application Priority Data
Aug. 27, 2013   (KR) ........................ 10-2013-0102006

(51) Int. Cl.
*G06F 17/50* (2006.01)
*H02J 7/00* (2006.01)
*B60L 3/00* (2006.01)
*B60L 11/18* (2006.01)

(52) U.S. Cl.
CPC .......... *H02J 7/0063* (2013.01); *B60L 3/0046* (2013.01); *B60L 11/1857* (2013.01); *B60L 11/1859* (2013.01); *B60L 11/1862* (2013.01); *B60L 2240/547* (2013.01); *H02J 2007/0067* (2013.01); *Y02T 10/7005* (2013.01); *Y02T 10/705* (2013.01); *Y02T 10/7044* (2013.01)

(58) Field of Classification Search
CPC ..................................................... H02J 7/007
USPC ......................................................... 320/107
See application file for complete search history.

(56) References Cited

U.S. PATENT DOCUMENTS

| | | | |
|---|---|---|---|
| 2009/0027056 A1* | 1/2009 | Huang | ............... B60L 11/1857 324/439 |
| 2011/0121787 A1 | 5/2011 | Kim et al. | |
| 2012/0069481 A1* | 3/2012 | Yamada | .................. H02H 7/18 361/93.7 |

FOREIGN PATENT DOCUMENTS

| | | |
|---|---|---|
| JP | 2007-037345 A | 2/2007 |
| KR | 2002-0066407 A | 8/2002 |
| KR | 10-2007-0035129 A | 3/2007 |
| KR | 10-0765830 | 10/2007 |

(Continued)

OTHER PUBLICATIONS

Machine English Translation of JP 2007-037345 A listed above, 15 pages.

*Primary Examiner* — Thuan Do
(74) *Attorney, Agent, or Firm* — Lewis Roca Rothgerber Christie LLP

(57) ABSTRACT

A battery pack includes a battery coupled between a first terminal and a second terminal and a battery manager configured to sense a state of charge of the battery; a load circuit coupled between the first terminal and the second terminal and configured to receive discharge power from the battery; a power generator coupled between the first terminal and the second terminal and configured to supply charge power to the battery; and a controller configured to control the battery pack and the power generator and to force discharging of the battery to make the state of charge of the battery equal to a reference value when a signal to initiate self-discharging is received from a user.

17 Claims, 3 Drawing Sheets

(56) References Cited

FOREIGN PATENT DOCUMENTS

KR     10-2011-0058378     6/2011
WO     WO 01/52382 A1     7/2001

\* cited by examiner

BATTERY PACK, APPARATUS HAVING THE SAME AND METHOD OF CONTROLLING BATTERY

CROSS-REFERENCE TO RELATED APPLICATION

This application claims priority to and the benefit of Korean Patent Application No. 10-2013-0102006, filed on Aug. 27, 2013, in the Korean Intellectual Property Office, the disclosure of which is incorporated herein in its entirety by reference.

BACKGROUND

1. Field

One or more embodiments of the present invention relate to a battery pack, an apparatus including the same, and a method of controlling a battery.

2. Description of the Related Art

In general, secondary batteries are rechargeable, unlike primary batteries which are not designed to be recharged. Secondary batteries may be used in the form of a single battery or in the form of a battery module in which a plurality of batteries are coupled with each other according to types of external devices to which the secondary batteries are applied.

The full discharge of secondary batteries affects them differently according to the type of the secondary battery that is fully discharged. For example, full discharge may reduce lifespan of secondary batteries such as lithium-ion batteries or lead-acid batteries. External devices to which secondary batteries are applied may stop operation for a long period of time, and accordingly, the secondary batteries may be exposed to self-discharging caused by dark current or long-term discharging caused by load current having a similar intensity to dark current. Such long-term discharging may cause full discharge of the secondary batteries.

SUMMARY

One or more embodiments of the present invention include a battery pack having improved self-discharge properties.

One or more embodiments of the present invention include a method of controlling a battery for improving self-discharge properties of the battery pack.

Additional aspects will be set forth in part in the description which follows and, in part, will be apparent from the description, or may be learned by practice of the presented embodiments.

According to one embodiment of the present invention, a battery pack includes a battery coupled between a first terminal and a second terminal and a battery manager configured to sense a state of charge of the battery; a load circuit coupled between the first terminal and the second terminal and configured to receive discharge power from the battery; a power generator coupled between the first terminal and the second terminal and configured to supply charge power to the battery; and a controller configured to control the battery pack and the power generator and to force discharging of the battery to make the state of charge of the battery equal to a reference value when a signal to initiate self-discharging is received from a user.

The battery pack-equipped apparatus may be a vehicle, and the signal to initiate self-discharging may be a long-term parking signal of the vehicle.

The controller may be configured to control the battery pack to make the battery output discharge power to the load circuit.

The battery may further include a discharge circuit coupled between the first terminal and the second terminal, and the controller may be configured to control the battery pack to make the battery output discharge power to the discharge circuit.

The controller may be configured to charge the battery by controlling the power generator to make the state of charge of the battery equal to the reference value upon the receipt of the signal to initiate self-discharging.

The reference value may be in a range between a first state of charge and a second state of charge, and the controller may be configured to change the first state of charge or the second state of charge according to a state of health (SOH) of the battery.

According to another embodiment of the present invention, a method of controlling a battery includes: receiving a signal to initiate self-discharging from an external device; sensing a state of charge of the battery; comparing the sensed state of charge with a reference value; and performing forced discharging of the battery when the sensed state of charge is greater than the reference value.

The performing of the forced discharging of the battery may include outputting discharge power of the battery to a load circuit coupled to the battery.

The method may further include charging the battery when the state of charge is less than the reference value.

The charging of the battery may include supplying charge power to the battery from a power generator coupled to the battery.

The reference value may be in a range between a first state of charge and a second state of charge, and the first state of charge or the second state of charge may vary according to a state of health (SOH) of the battery.

According to another embodiment of the present invention, a battery pack includes: a battery coupled between a first terminal and a second terminal and configured to receive charge power and to output discharge power; and a battery manager configured to receive a signal to initiate self-discharging from an external device and to control forced discharging of the battery to make a state of charge (SOC) of the battery equal to a reference value.

The battery manager may be configured to transmit a signal to initiate charging to the external device when the state of charge of the battery is less than the reference value.

The battery manager may be configured to transmit a signal to initiate discharging to the external device when the state of charge of the battery is greater than the reference value.

The battery pack may further include a discharge circuit coupled between the first terminal and the second terminal, wherein the battery manager is configured to control the discharge circuit to discharge the battery.

The reference value may be in a range between a first state of charge and a second state of charge, and the battery manager may be configured to change the first state of charge or the second state of charge according to a state of health (SOH) of the battery.

BRIEF DESCRIPTION OF THE DRAWINGS

These and/or other aspects will become apparent and more readily appreciated from the following description of the embodiments of the present invention, taken in conjunction with the accompanying drawings of which.

DETAILED DESCRIPTION

Figure 1:
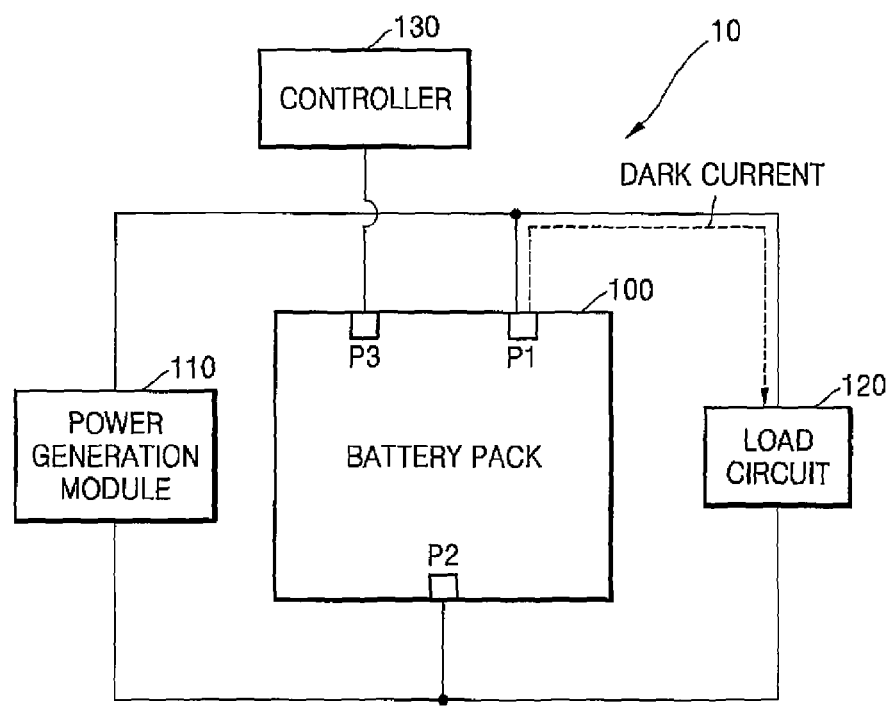
FIG. 1 is a block diagram of an apparatus including a battery pack according to an embodiment of the present invention.

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the embodiments of the present invention are merely described below, by referring to the figures, to explain aspects of the present invention.

Hereinafter, a battery pack and a method of controlling the same according to embodiments of the present invention will now be described more fully with reference to the accompanying drawings, in which exemplary embodiments of the present invention are shown.

FIG. 1 is a block diagram of an apparatus including a battery pack according to an embodiment of the present invention. An apparatus including a battery pack (hereinafter, referred to as a battery pack-equipped apparatus) 10 includes a battery pack 100, a power generation module (e.g., a power generator) 110, a load circuit 120, and a controller 130. The battery pack 100 may include first and second terminals P1 and P2 and a battery unit (or a battery) that is coupled between the first and second terminals P1 and P2 to receive charge power and output discharge power. The battery pack 100 may be coupled to the power generation module 110 and the load circuit 120 in parallel via the first and second terminals P1 and P2. The controller 130 may recognize a signal input from an external device and may control the battery pack 100, the power generation module 110, and the load circuit 120.

The battery pack-equipped apparatus 10 may be a vehicle including a battery. For example, the battery pack-equipped apparatus 10 may be a car including a battery, a hybrid car, a motorcycle, or the like.

The battery pack 100 may store charge power generated by the power generation module 110 and supply discharge power to the load circuit 120. For example, the power generation module 110 may be coupled to a car engine, particularly, to a driving axis of the engine, thereby converting rotation power thereof into electric energy. The charge power generated by the power generation module 110 may be stored in the battery unit contained in the battery pack 100 via the first and second terminals P1 and P2 of the battery pack 100.

The load circuit 120 may be coupled to the battery pack 100 through the first and second terminals P1 and P2. The load circuit 120 may be operated (e.g., powered) using the discharge power supplied from the battery pack 100 via the first and second terminals P1 and P2. For example, the load circuit 120 may include a light, a black box, a heater, or the like, of the vehicle.

The controller 130 may recognize a signal input from an external device and may control the battery pack-equipped apparatus 10. The controller 130 may initiate operation of the power generation module 110 or stop the operation of the power generation module 110 according to the external input signal. The controller 130 may control each of various power-consuming parts of the load circuit 120 according to the external input signal. The controller 130 may control the battery pack 100 via a third terminal P3 of the battery pack 100.

The controller 130 may recognize a control signal to control the battery pack 100 input from an external device. For example, when it is expected that the battery pack-equipped apparatus 10 will not be operated for a long period of time, a user of the battery pack-equipped apparatus 10 may input a control signal corresponding to the long-term non-use of the battery pack-equipped apparatus 10, for example, a long-term parking signal, via an input device of the battery pack-equipped apparatus 10. The controller 130 may receive the control signal input through the input device. The controller 130 may also control self-discharge properties of the battery pack 100 in accordance with the control signal. The battery pack 100 may perform self-discharging according to the controlled self-discharge properties.

The controller 130 may also control the self-discharge properties of the battery pack 100 based on results of self-determination as well as the control signal input by the user. For example, when the battery pack-equipped apparatus 10 is a vehicle and the user does not start the vehicle for a period of time (e.g., a predetermined period of time), e.g., 3 days, after stopping the vehicle, the controller 130 may control self-discharge properties of the battery pack 100.

Figure 2:
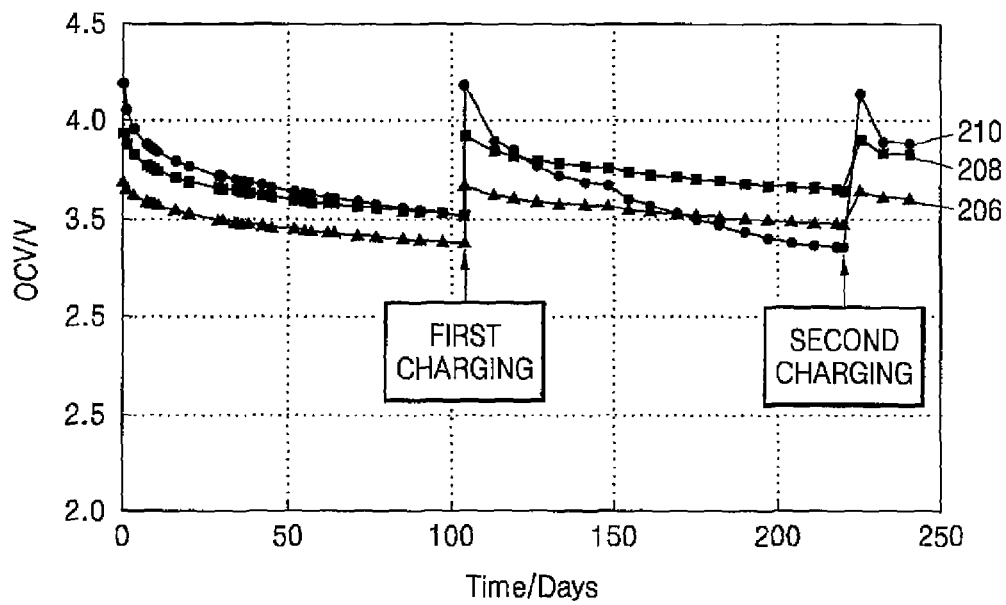
FIG. 2 is a graph illustrating self-discharge properties of battery packs according to states of charge of the battery packs at an early stage of self-discharging.

FIG. 2 is a graph illustrating self-discharge properties of battery packs according to states of charge of the battery packs at an early stage of self-discharging. In FIG. 2, the open circuit voltage (OCV) of the battery packs are graphed as a function of time. The states of charge of the battery packs at an early stage of self-discharging may vary according to states of use of the battery packs. FIG. 2 shows self-discharge properties of battery packs 210, 208, and 206 respectively having 100%, 80%, and 60% states of charge at the early stage of self-discharging.

The self-discharge properties of battery packs may vary according to an intensity of dark current and a state of health (SOH) of the battery pack. For example, as illustrated in FIG. 2, self-discharge properties of the battery packs 210, 208, and 206 until first charging may be different from those of the battery packs 210, 208, and 206 between the first charging and second charging. In addition, the battery pack 210 having 100% state of charge at the early stage of self-discharging may have a relatively large change between the self-discharge properties from the initiation of self-discharging to the first charging and the self-discharge properties from the first charging to the second charging. On the other hand, the battery packs 208 and 206 respectively having 80% and 60% states of charge at the early stage of self-discharging may have relatively small changes between the self-discharge properties from the initiation of self-discharging to the first charging and the self-discharge properties from the first charging to the second charging.

As illustrated in FIG. 2, a full discharge time of a battery pack may vary according to the state of charge of the battery pack at an early stage of self-discharging. For example, upon comparison of the battery packs 210, 208, and 206 respectively having 100%, 80%, and 60% states of charge at the early stage of self-discharging, in the range between the initiation of self-discharging and the first charging illustrated in FIG. 2, the battery packs 208 and 206 respectively having 80% and 60% states of charge at the early stage of self-discharging exhibit relatively parallel reductions in the states of charge. On the other hand, the battery pack 210 having 100% state of charge at the early stage of self-discharging exhibits a relatively sharp reduction in the state of charge. Accordingly, referring to FIG. 2, the state of charge of the battery pack 210 is less than that of the battery pack 208 at the first charging.

In addition, upon comparison in the range between the first charging and the second charging of FIG. 2, the state of charge of the battery pack 210 becomes lower than that of the battery pack 208 at an earlier time compared to the previous range. In other words, self-discharge rates may vary according to the state of charge of the battery pack at the early stage of self-discharging.

According to an embodiment of the present invention, a state of charge of the battery pack capable of increasing a time period (e.g., maximally increasing a time period) for fully discharging the battery pack may be a reference value (e.g., may be preset as a reference value). The reference value may be obtained through self-discharging tests of the battery pack and may be a value between first and second states of charge. The reference value may vary according to the state of health (SOH) of the battery pack. Accordingly, the first and second states of charge may also be changed. The battery pack may be forced to be discharged or charged such that the state of charge of the battery pack at the early stage of self-discharging reaches the reference value.

The state of charge of the battery pack may be a state of charge of the battery unit contained in the battery pack. The state of health (SOH) or the state of use of the battery pack may also be a state of health (SOH) or a state of use of the battery unit contained in the battery pack.

Figure 3A:
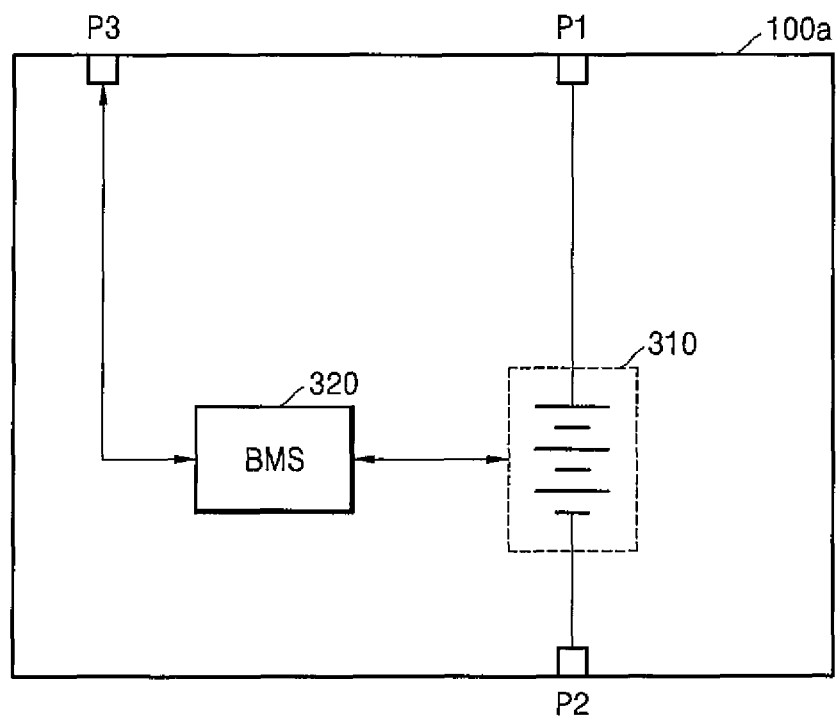
FIGS. 3A and 3B illustrate examples of the battery pack shown in FIG. 1 according to embodiments of the present invention.
Figure 3B:
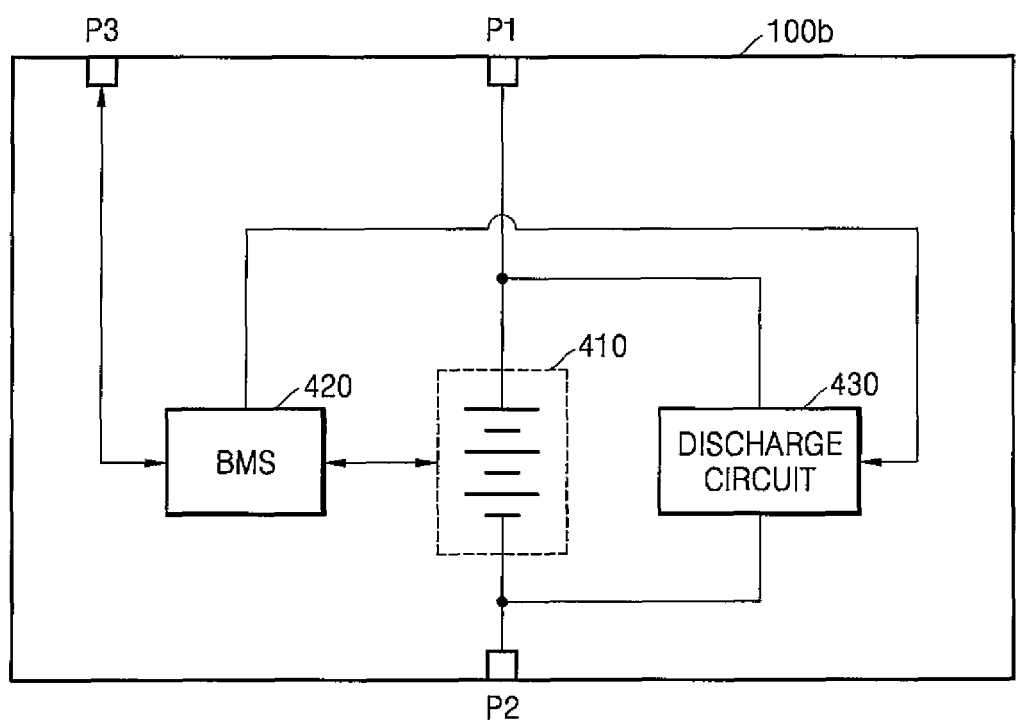

FIGS. 3A and 3B illustrate examples of the battery pack shown in FIG. 1 according to embodiments of the present invention. FIG. 3A illustrates an example of the battery pack shown in FIG. 1 according to an embodiment of the present invention. A battery pack 100a may include a battery unit (or battery) 310 and a battery management unit (or battery manager) 320. The battery unit 310 may be coupled to the first and second terminals P1 and P2 of the battery pack 100a and may receive charge power or output discharge power via the first and second terminals P1 and P2.

The battery management unit 320 that is also referred to as a battery management system (BMS) may control the battery unit 310 or may sense the status of the battery unit 310. For example, the battery management unit 320 may sense temperature of the battery unit 310, an open circuit voltage, and magnitudes of charging and discharging current and may also control the battery unit 310, for example, to stop charging and discharging, in case of emergency.

In addition, the battery management unit 320 may be coupled to a third terminal P3 of the battery pack 100a and may communicate with an external device of the battery pack 100a via the third terminal P3. For example, as illustrated in FIG. 1, the third terminal P3 of the battery pack 100a may be coupled to the controller 130, and the battery management unit 320 may communicate with the controller 130 that is an external device of the battery pack 100a. The battery management unit 320 may receive commands for setting various parameters of the battery pack 100a from the controller 130, and the controller 130 may receive information regarding the status of the battery pack 100a from the battery management unit 320.

According to an embodiment, the battery management unit 320 may receive a signal requesting information regarding the state of charge of the battery unit 310 from the external device, e.g., the controller 130 shown in FIG. 1, via the third terminal P3. When the battery management unit 320 receives the signal requesting information regarding the state of charge of the battery unit 310, the battery management unit 320 may sense the state of charge of the battery unit 310 and may transmit the state of charge of the battery unit 310 to the external device via the third terminal P3.

The controller 130 shown in FIG. 1 may compare the state of charge of the battery unit 310 received from the battery management unit 320 with the reference value (e.g., the preset reference value). When the state of charge of the battery unit 310 is greater than the reference value, the controller 130 may control the battery pack 100a or the load circuit 120 shown in FIG. 1 such that discharge power of the battery unit 310 is forced to be supplied to the load circuit 120. In other words, the controller 130 may forcibly operate the load circuit 120 such that the discharge power is output from the battery pack 100a. The load circuit 120 may include loads such as an air conditioner, a heater, a stereo system, interior lamps, or head lights which are turned off when the vehicle engine is stopped.

As the battery unit 310 supplies the discharge power to the load circuit 120 via the first and second terminals P1 and P2, the state of charge of the battery unit 310 may be reduced. The controller 130 may stop the output of the discharge power from the battery unit 310 after communicating with the battery management unit 320 when the state of charge of the battery unit 310 is reduced to the reference value.

When the state of charge of the battery unit 310 is less than the reference value, the controller 130 may control the power generation module 110 shown in FIG. 1 to supply charge power to the battery unit 310 of the battery pack 100a. As the power generation module 110 supplies the charge power to the battery unit 310 via the first and second terminals P1 and P2 of the battery pack 100a, the state of charge of the battery unit 310 may be increased. The controller 120 may stop the supply of the charge power to the battery unit 310 after communicating with the battery management unit 320 when the state of charge of the battery unit 310 is increased to the reference value.

According to another embodiment of the present invention, the battery management unit 320 may receive a signal to initiate self-discharging from an external device via the third terminal P3. When the battery management unit 320 receives the signal to initiate self-discharging from the external device, the battery management unit 320 may sense the state of charge of the battery unit 310. The battery management unit 320 may compare the sensed state of charge with the reference value (e.g., the preset reference value).

When the state of charge of the battery unit 310 is greater than the reference value, the battery management unit 320 may transmit a signal to perform forced discharging via the third terminal P3. When the controller 130 shown in FIG. 1 receives the signal to perform forced discharging from the battery management unit 320 of the battery pack 100a, the controller 130 may control the battery pack 100a or the load circuit 120 shown in FIG. 1 such that discharge power of the battery unit 310 is supplied to the load circuit 120. As the battery unit 310 supplies discharge power to the load circuit 120 via the first and second terminals P1 and P2, the state of charge of the battery unit 310 may be reduced. The battery management unit 320 senses the state of charge of the battery unit 310. When the state of charge of the battery unit 310 is reduced to the reference value, the battery management unit 320 may transmit a signal to stop the forced discharging to the external device via the third terminal P3. The controller 130, as an external device of the battery pack 100a, may receive the signal to stop the forced discharging, and accordingly, the supply of the discharge power of the battery unit 310 to the load circuit 120 may be stopped.

When the state of charge of the battery unit 310 is less than the reference value, the battery management unit 320 may transmit a signal to perform charging via the third terminal P3. When the controller 130 shown in FIG. 1 receives the signal to perform charging from the battery management unit 320 of the battery pack 100a, the controller 130 may control the power generation module 110 shown in FIG. 1 to supply charge power to the battery unit 310 of the battery pack 100a. As the power generation module 110 supplies the charge power to the battery unit 310 via the first and second terminals P1 and P2 of the battery pack 100a, the state of charge of the battery unit 310 may be increased. The battery management unit 320 senses the state of charge of the battery unit 310. When the state of charge of the battery unit 310 is increased to the reference value, the battery management unit 320 may transmit a signal to stop charging to the external device via the third terminal P3. The controller 130, as an external device of the battery pack 100a, may receive the signal to stop charging, and accordingly, the controller 130 may control the power generation module 110 to stop the supply of the charge power of the battery pack 110a to the battery unit 310.

FIG. 3B illustrates another example of the battery pack shown in FIG. 1 according to another embodiment of the present invention. A battery pack 100b may include a battery unit 410, a battery management unit 420, and a discharge circuit 430. The battery unit 410 may be coupled to the first and second terminals P1 and P2 of the battery pack 100b and may receive charge power or output discharge power via the first and second terminals P1 and P2.

As described above with reference to FIG. 3A, the battery management unit 420 may control the battery unit 410 or sense the status of the battery unit 410. In addition, the battery management unit 420 may be coupled to a third terminal P3 of the battery pack 100b and may communicate with an external device of the battery pack 100b via the third terminal P3.

According to an embodiment of the present invention, the battery management unit 420 may receive a signal to initiate self-discharging from the external device via the third terminal P3. When the battery management unit 420 receives the signal to initiate self-discharging from the external device, the battery management unit 420 may sense the state of charge of the battery unit 410. The battery management unit 420 may compare the sensed state of charge with the reference value (e.g., the preset reference value).

When the state of charge of the battery unit 410 is greater than the reference value, the battery management unit 420 controls the discharge circuit 430 such that discharge power of the battery unit 410 is supplied to the discharge circuit 430. As the battery unit 410 supplies the discharge power to the discharge circuit 430 coupled to the battery unit 410, the state of charge of the battery unit 410 may be reduced. The battery management unit 420 senses the state of charge of the battery unit 410. When the state of charge of the battery unit 410 is reduced to the reference value, the battery management unit 420 may control the discharge circuit 430 to stop forced discharging of the battery unit 410.

When the state of charge of the battery unit 410 is less than the reference value, the battery management unit 420 may transmit a signal to perform charging via the third terminal P3. When the controller 130 shown in FIG. 1 receives the signal to perform charging from the battery management unit 420 of the battery pack 100b, the controller 130 may control the power generation module 110 shown in FIG. 1 to supply charge power to the battery unit 410 of the battery pack 100b. As the power generation module 110 supplies the charge power to the battery unit 410 via the first and second terminals P1 and P2 of the battery pack 100b, the state of charge of the battery unit 410 may be increased. The battery management unit 420 senses the state of charge of the battery unit 410. When the state of charge of the battery unit 410 is increased to the reference value, the battery management unit 320 may transmit a signal to stop charging to the external device via the third terminal P3. The controller 130, as an external device of the battery pack 100b, may receive the signal to stop charging, and accordingly, the controller 130 may control the power generation module 110 to stop the supply of the charge power of the battery pack 100b to the battery unit 410.

According to the embodiments of the present invention described above with reference to FIGS. 3A and 3B, components for storing the reference values of the states of charge of the battery units 310 and 410 at the early stage of the self-discharge may be the controller 130 shown in FIG. 1 or the battery management unit 320 or 420 shown in FIG. 3A or 3B. In addition, components of comparing the reference value with the states of charge of the battery units 310 and 410 may be the controller 130 shown in FIG. 1 and the battery management unit 320 or 420 shown in FIG. 3A or 3B. As described above, the full discharge time may be extended by reducing the self-discharge rate of the battery unit by controlling the state of charge of the battery unit at the early stage of self-discharging.

Figure 4:
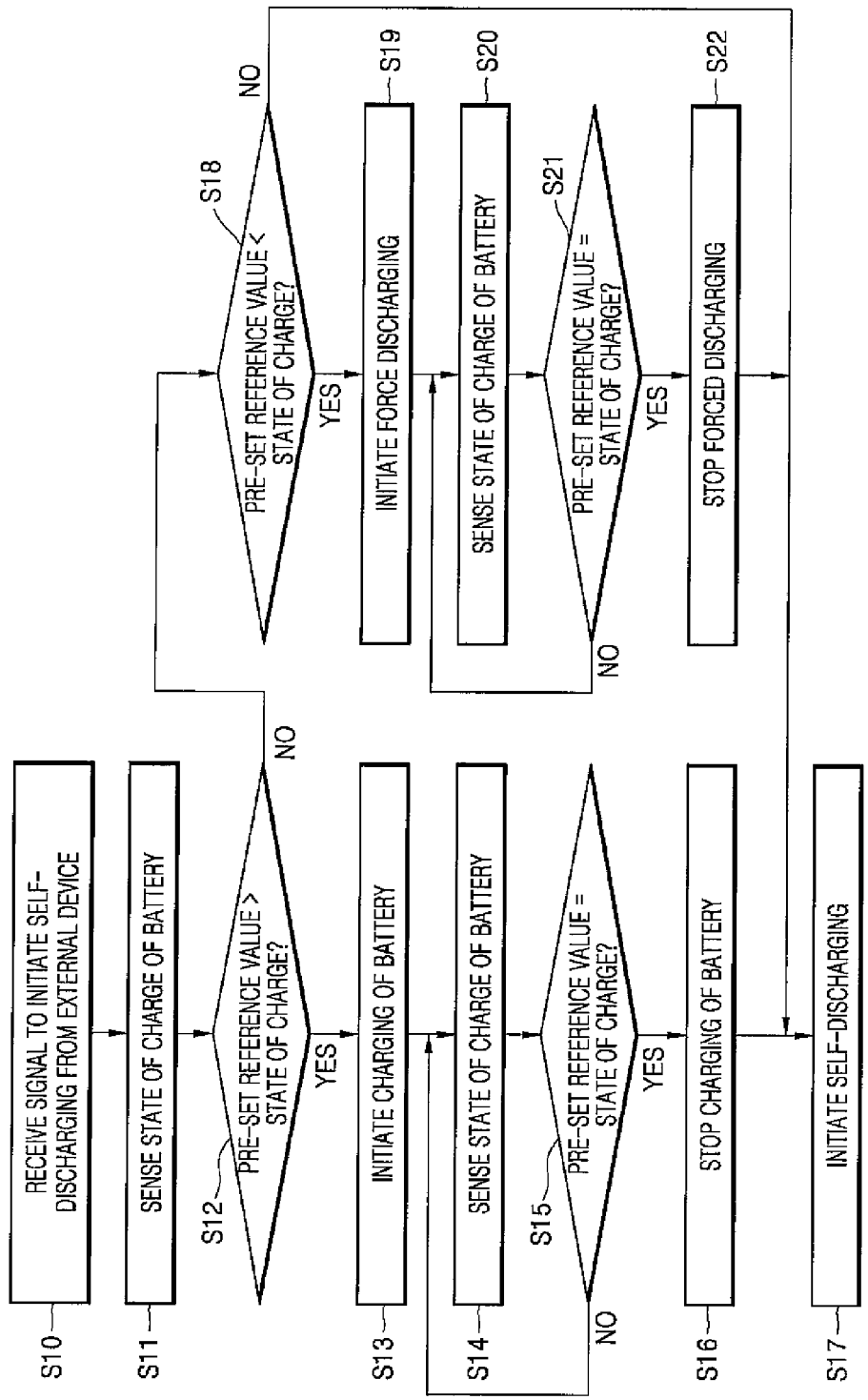
FIG. 4 is a flowchart illustrating a method of controlling a battery pack according to an embodiment of the present invention.

FIG. 4 is a flowchart illustrating a method of controlling a battery pack according to an embodiment of the present invention. The method illustrated in FIG. 4 may be performed by the controller 130 shown in FIG. 1 that controls the battery pack-equipped apparatus or by the battery management unit of the battery pack 100. However, the method illustrated in FIG. 4 may also be performed by any other components, without being limited to the controller 130 and the battery management unit of the battery pack 100. Hereinafter, the method of controlling a battery pack, as illustrated in FIG. 4, performed by the controller 130 shown in FIG. 1 will be described as an example.

A controller may receive a signal to initiate self-discharging from an external device (S10). When a battery pack-equipped apparatus is not used for a long period of time, a user of the battery pack-equipped apparatus may input a command of indicating a long-term non-use of the battery pack-equipped apparatus via an input device of the battery pack-equipped apparatus. The input device may transmit a signal to initiate self-discharging to the controller in response to the command of the user. Alternatively, the controller may receive the user command through the input device and regard the command as the signal to initiate self-discharging.

When the controller receives the signal to initiate self-discharging from the external device, the controller may communicate with the battery pack to sense the state of charge of the battery unit contained in the battery pack (S11). For example, the controller may transmit a signal requesting information regarding the state of charge of the battery unit to the battery pack. The battery management unit contained in the battery pack may sense the state of charge of the battery unit in response to the signal from the controller. The battery management unit may transmit the sensed state of charge to the controller that is an external device of the battery pack. The controller may receive the state of charge of the battery unit from the battery pack (or the battery management unit of the battery pack), thereby obtaining information regarding the state of charge of the battery unit.

The controller may determine whether or not the sensed state of charge is less than the reference value by comparing the reference value (e.g., the preset reference value) of the state of charge of the battery unit with the sensed state of charge of the battery unit (S12). The reference value stored in the controller, which may be a value (e.g., a preset value) obtained through tests of the battery pack, may be a state of charge of the battery unit capable of extending a time period (e.g., maximally extending a time period) for fully discharging the battery unit when the battery unit of the battery pack is self-discharged. In addition, the reference value may be a value between first and second states of charge. When the first state of charge is greater than the second state of charge, the controller may determine whether the sensed state of charge is less than the second state of charge.

When the sensed state of charge is less than the reference value, the controller may initiate charging of the battery unit such that the state of charge of the battery unit reaches the reference value (S13). The controller may control the power generation module coupled to the battery unit in parallel to generate charge power for the battery unit. The charge power generated by the power generation module may be supplied to the battery unit, thereby increasing the state of charge of the battery unit.

The controller may communicate with the battery pack to sense the state of charge of the battery unit contained in the battery pack (S14). The controller may acquire information regarding the state of charge of the battery unit from the battery pack in substantially the same manner as that of operation S11.

The controller may determine whether the sensed state of charge is equal to the reference value by comparing the reference value (e.g., the preset reference value) of the state of charge of the battery unit with the sensed state of charge of the battery unit (S15). For example, when the reference value is within the range between the first and second states of charge, and the sensed state of charge is within this range, the controller may determine that the reference value is equal to the sensed state of charge. When the sensed state of charge is not equal to the reference value, the controller may communicate with the battery pack to sense the state of charge of the battery unit contained in the battery pack again (S14).

When the sensed state of charge is equal to the reference value, the controller may stop charging of the battery unit (S16). The controller may control the power generation module to stop the supply of charge power to the battery unit. When charging of the battery unit is stopped, the battery unit may initiate self-discharging (S17).

The controller receives a signal to initiate the self-discharge (810), senses the state of charge of the battery unit (S11), and then determines whether or not the sensed state of charge is less than the reference value. When the sensed state of charge is not less than the reference value, the controller determines whether or not the sensed state of charge is greater than the reference value (S18). When the sensed state of charge is not greater than the reference value, the sensed state of charge is equal to the reference value (e.g., the preset reference value). Thus, the battery unit may initiate self-discharging (S17).

When the sensed state of charge is greater than the reference value, the controller may initiate forced discharging of the battery unit such that the state of charge of the battery unit reaches the reference value (S19). The controller controls the load circuit coupled to the battery unit in parallel, for example, by operating the load circuit, such that discharge power of the battery unit is supplied to the load circuit. As the discharge power is supplied to the load circuit from the battery unit, the state of charge of the battery unit may be reduced.

The controller may communicate with the battery pack to sense the state of charge of the battery unit contained in the battery pack (S20). The controller may acquire information regarding the state of charge of the battery unit from the battery pack in substantially the same manner as that of operation S11.

The controller may determine whether or not the sensed state of charge is equal to the reference value by comparing the reference value (e.g., the preset reference value) of the state of charge of the battery unit with the sensed state of charge of the battery unit (S21). For example, when the reference value is within the range between the first and second states of charge, and the sensed state of charge is within this range, the controller may determine that the reference value is equal to the sensed state of charge. When the sensed state of charge is not equal to the reference value, the controller may communicate with the battery pack to sense the state of charge of the battery unit contained in the battery pack again (S20).

When the sensed state of charge is equal to the reference value, the controller may stop forced discharging of the battery unit (S22). The controller may control the load circuit such that the battery unit stops the supply of the discharge power to the load circuit. When the forced discharging of the battery unit is stopped, the battery unit may initiate self-discharging (S17).

As described above, the method illustrated in FIG. 4 may be performed using the controller. However, the method is not limited to the controller, and the method may also be performed by another component of an apparatus including the battery.

As described above, according to one or more of the above embodiments of the present invention, self-discharge properties of the battery pack may be improved and a full discharge time may be extended. Furthermore, the battery pack and the method of controlling the battery pack according to one or more of the above embodiments of the present invention may reduce the risk of full discharge when a vehicle, as a battery pack-equipped apparatus, is parked for a long period of time.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made herein without departing from the spirit and scope of the present invention as defined by the following claims, and equivalents thereof.

What is claimed is:

1. A battery pack-equipped apparatus comprising:

a battery pack comprising a battery coupled between a first terminal and a second terminal, and a battery manager configured to sense a state of charge of the battery;

a load circuit connected between the first terminal and the second terminal, and configured to receive discharge power from the battery;

a power generator coupled between the first terminal and the second terminal, and configured to supply charge power to the battery; and a controller configured to control the battery pack via a third terminal, to control the load circuit by turning on a function of the load circuit, to control the power generator to charge the battery, and to force discharging from the battery to the load circuit to make the state of charge of the battery equal to a reference value when a signal to initiate self-discharging is received from a user.

2. The apparatus of claim 1, wherein the battery pack-equipped apparatus is a vehicle, and
wherein the signal to initiate self-discharging is a long-term parking signal of the vehicle.

3. The apparatus of claim 1, wherein the controller is configured to contol the battery pack to make the battery output discharge power to the load circuit.

4. The apparatus of claim 1, wherein the battery further comprises a discharge circuit coupled between the first terminal and the second terminal, and
wherein the controller is configured to control the battery pack to make the battery output discharge power to the discharge circuit.

5. The apparatus of claim 1, wherein the controller is configured to charge the battery by controlling the power generator to make the state of charge of the battery equal to the reference value upon receipt of the signal to initiate self-discharging.

6. The apparatus of claim 1, wherein the reference value is in a range between a first state of charge and a second state of charge, and
wherein the controller is configured to change the first state of charge or the second state of charge according to a state of health (SOH) of the battery.

7. The apparatus of claim 1, wherein the controller is configured to control each of various power-consuming parts of the load circuit.

8. The apparatus of claim 2, wherein the power generator is configured to convert rotation power corresponding to motion of the vehicle into electric energy.

9. A method of controlling a battery using a controller, the method comprising:
receiving a signal to initiate self-discharging from an external device;
sensing a state of charge of the battery indicating a degree to which the battery is charged;
comparing the sensed state of charge with a reference value; and
performing forced discharging from the battery to a load circuit when the sensed state of charge is greater than the reference value by turning on a function of the load circuit and outputting discharge power of the battery to the load circuit.

10. The method of claim 9, further comprising charging the battery when the state of charge is less than the reference value.

11. The method of claim 10, wherein the charging of the battery comprises supplying charge power to the battery from a power generator coupled to the battery.

12. The method of claim 9, wherein the reference value is in a range between a first state of charge and a second state of charge, and
wherein the first state of charge or the second state of charge varies according to a state of health (SOH) of the battery.

13. A battery pack comprising:
a battery coupled between a first terminal and a second terminal, and configured to receive charge power and to output discharge power;
a discharge circuit; and
a battery manager configured to receive a signal to initiate self-discharging from an external device, and to control forced discharging from the battery to a load circuit by turning on a function of the load circuit to make a state of charge (SOC) of the battery, which indicates a degree to which the battery is charged, equal to a reference value by controlling the discharge circuit to discharge the battery and outputting discharge power of the battery to the load circuit or to the discharge circuit.

14. The battery pack of claim 13, wherein the battery manager is configured to transmit a signal to initiate charging to the external device when the state of charge of the battery is less than the reference value.

15. The battery pack of claim 13, wherein the battery manager is configured to transmit a signal to initiate discharging to the external device when the state of charge of the battery is greater than the reference value.

16. The battery pack of claim 13, wherein the discharge circuit is coupled between the first terminal and the second terminal.

17. The battery pack of claim 13, wherein the reference value is in a range between a first state of charge and a second state of charge, and
wherein the battery manager is configured to change the first state of charge or the second state of charge according to a state of health (SOH) of the battery.

* * * * *